(12) United States Patent
Semmer et al.

(10) Patent No.: US 9,287,740 B2
(45) Date of Patent: Mar. 15, 2016

(54) POLE SHOE ARRANGEMENT FOR A MACHINE ELEMENT OF AN ELECTRICAL MACHINE

(71) Applicants: Silvio Semmer, Brande (DK); Xavier Tourde, Brande (DK); Adriana Cristina Urda, Odense M (DK)

(72) Inventors: Silvio Semmer, Brande (DK); Xavier Tourde, Brande (DK); Adriana Cristina Urda, Odense M (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 265 days.

(21) Appl. No.: 13/864,497

(22) Filed: Apr. 17, 2013

(65) Prior Publication Data

US 2013/0270950 A1    Oct. 17, 2013

(30) Foreign Application Priority Data

Apr. 17, 2012  (EP) ..................... 12164431
Jun. 8, 2012   (EP) ..................... 12171279
Nov. 8, 2012   (DE) ............. 10 2012 220 381

(51) Int. Cl.
*H02K 21/12*   (2006.01)
*H02K 1/17*    (2006.01)
*H02K 1/27*    (2006.01)
*H02K 15/03*   (2006.01)
*H02K 1/02*    (2006.01)
*H02K 7/18*    (2006.01)

(52) U.S. Cl.
CPC .. *H02K 1/17* (2013.01); *H02K 1/27* (2013.01); *H02K 1/2773* (2013.01); *H02K 1/2786* (2013.01); *H02K 15/03* (2013.01); *H02K 1/02* (2013.01); *H02K 7/1838* (2013.01); *Y02E 10/725* (2013.01); *Y10T 29/49012* (2015.01)

(58) Field of Classification Search
CPC ..... H02K 1/27; H02K 1/2706; H02K 1/2713; H02K 1/272; H02K 1/2726; H02K 1/2733; H02K 1/274; H02K 1/2746; H02K 1/2753; H02K 1/276; H02K 1/2766; H02K 1/2773; H02K 1/278; H02K 1/2786; H02K 1/2793
USPC ............. 310/156, 216.079, 253, 263; 29/596
See application file for complete search history.

(56) References Cited

U.S. PATENT DOCUMENTS

| | | | | |
|---|---|---|---|---|
| 2,334,153 A | * | 11/1943 | Wilson | 310/46 |
| 2,736,829 A | * | 2/1956 | Sills | 310/216.098 |
| 2,739,253 A | * | 3/1956 | Plumb | 310/156.77 |
| 4,021,691 A | * | 5/1977 | Dukshtau et al. | 310/216.114 |
| 4,268,773 A | * | 5/1981 | Beck et al. | 310/269 |
| 5,818,138 A | * | 10/1998 | Hill | 310/152 |

(Continued)

FOREIGN PATENT DOCUMENTS

| | | | | |
|---|---|---|---|---|
| DE | 102004031329 A1 | | 1/2006 | |
| WO | WO 2011/009886 | * | 1/2011 | H02K 15/03 |

*Primary Examiner* — Hanh Nguyen (57) ABSTRACT

A pole shoe arrangement for a rotor or a stator of an electrical machine having an air gap between the stator and the rotor is disclosed. The pole shoe arrangement has a pole shoe element having an inner end and an outer end opposing the inner end. The inner end lies opposite the air gap when the pole shoe element is in an assembled state. The pole shoe element has a receiving surface for receiving a permanent magnet between the inner end and the outer end. The pole shoe arrangement has a guiding facility to guide the permanent magnet in a radial direction from the outer end to the inner end and to limit a movement of the permanent magnet at right angles to the radial direction.

11 Claims, 5 Drawing Sheets

(56) References Cited

U.S. PATENT DOCUMENTS

| | | |
|---|---|---|
| 6,392,324 B1 * | 5/2002 | Kuwahara ................ 310/156.11 |
| 6,601,287 B2 * | 8/2003 | Pop, Sr. .......................... 29/596 |
| 6,603,237 B1 * | 8/2003 | Caamano .................. 310/254.1 |
| 2004/0108781 A1 * | 6/2004 | Razzell et al. ................ 310/112 |
| 2008/0211326 A1 * | 9/2008 | Kang et al. ...................... 310/44 |
| 2010/0033046 A1 * | 2/2010 | Chiba et al. .................. 310/90.5 |
| 2012/0206008 A1 * | 8/2012 | Blanc et al. .............. 310/156.48 |

* cited by examiner

POLE SHOE ARRANGEMENT FOR A MACHINE ELEMENT OF AN ELECTRICAL MACHINE

CROSS REFERENCE TO RELATED APPLICATIONS

The present application claims priority to European Patent Office application No. 12164431.4 EP filed Apr. 17, 2012, and priority to European Patent Office application No. 12171279.8 EP filed Jun. 8, 2012, and priority to German application No. 10 2012 220 381.8 DE filed Nov. 8, 2012, the entire content of which is hereby incorporated herein by reference.

FIELD OF THE INVENTION

The present invention relates to the technical field of electrical machines which comprise a machine element comprising magnets, in particular permanent magnets, and which forms a stator or a rotor of the electrical machine, wherein the rotor can be rotated in respect of the stator. The invention relates in particular to a pole shoe arrangement for a rotor or a stator of an electrical machine. The invention further relates to a machine element in the form of a rotor or a stator and an electrical machine.

BACKGROUND OF THE INVENTION

An electrical machine is an electromechanical converter, which performs an energy conversion between mechanical energy and electrical energy by using a magnetic field link. The electrical machine may be for instance an electric motor (abbreviated to motor) or an electric generator (abbreviated to generator) or a motor/generator, which can be operated both as a motor and also as a generator. For instance, an electric generator is an electromechanical converter, which converts mechanical energy into electrical energy using a magnetic field link. An electric motor is an electromechanical converter, which converts electrical energy into mechanical energy using a magnetic field link. An electrical machine includes a stator and a rotor. The stator is an arrangement which represents the stationary part of an electrical machine. The rotor may represent a part or parts of the electrical machine which move relative to the stator, in particular rotate relative to the stator. The rotor may therefore contain magnets, such as for instance permanent magnets, which rotate relative to one or a number of coils which are contained in the stator. In one form, the rotor rotates about the stator.

In conventional systems, the magnetized rotor and the wound stator are produced as independent components and are then combined. The magnets are embedded in a cylindrical steel rotor structure for instance by means of adhesion. Topologies of the rotor for flow concentration are usually used for electrical machines with a lower output. Nevertheless, in conventional arrangements magnets and iron parts are arranged close to one another in order to achieve a flow concentration. Nevertheless these topologies should be arranged prior to combining the rotor and the stator.

SUMMARY OF INVENTION

There may therefore be a need to facilitate the assembly of permanent magnets on a machine element of an electromechanical converter while providing for an improved flow distribution within the machine element.

This need may be satisfied by the subject matter according to the independent claims. Advantageous embodiments of the present invention are described in the dependent claims.

According to one embodiment of a first aspect of the subject matters disclosed herein, a pole shoe arrangement is provided for an electrical machine, wherein the electrical machine has a stator, a rotor and an air gap between the stator and the rotor. The pole shoe arrangement contains a pole shoe element which comprises an inner end, wherein the inner end is embodied so as oppose the air gap of the electrical machine when the pole shoe element is in the assembled state. According to an embodiment, the pole shoe element comprises an outer end opposing the inner end, wherein between the inner end and the outer end, the pole shoe element comprises a receiving surface for receiving a permanent magnet. According to an embodiment, the pole shoe arrangement comprises a guiding facility, which is embodied to guide the permanent magnet in a radial direction from the outer end to the inner end, and to limit a movement of the permanent magnet at right angles to the radial direction.

Unless otherwise specified, the term "air gap" herein refers to the air gap between the stator and the rotor of the electrical machine. The term "electrical machine" herein refers to an electromechanical converter, which is embodied to convert mechanical energy into electrical energy and/or electrical energy into mechanical energy by using a magnetic field link.

According to one embodiment, the rotor defines an axial direction which runs in parallel to an axis of rotation of the rotor and a peripheral direction, which is parallel to a direction of movement or a movement of a point on the rotor when rotating the rotor about its axis of rotation.

According to an embodiment, the receiving surface is provided to receive at least one permanent magnet, for instance two or more permanent magnets. According to an embodiment, the receiving surface is a planar surface. A planar surface may allow for a gap-free positioning of a square-shaped permanent magnet.

According to an embodiment, the guiding facility is embodied for an arrangement of the permanent magnet adjacent to the guiding facility.

According to an embodiment, the guiding facility includes at least one projection, which projects beyond the receiving surface. In this way the projection forms a stop surface for a permanent magnet which rests on the receiving surface, which prevents the permanent magnet from moving out of the position of the projection. According to an embodiment, the at least one projection is embodied so as to limit two or more permanent magnets when moving at right angles to the radial direction. Generally, according to an embodiment, the guiding facility is provided in order to guide the permanent magnet, with an insertion movement, into a direction from the outer end to the inner end. Further, according to an embodiment, the guiding facility is embodied to prevent a permanent magnet in its end position from moving at right angles to the radial direction, for instance upon insertion of a further permanent magnet in the radial direction relative to the permanent magnet in the end position, in order to allow for a defined arrangement of the two permanent magnets, even if the permanent magnets abut one another.

According to an embodiment, the projection extends about a stretch across the receiving surface which is shorter than the extension of the permanent magnet at right angles to the receiving surface. In other words, according to one embodiment the projection only extends beyond part of the lateral surface of the permanent magnet. For instance, the projection can only project a few millimeters (mm) beyond the receiving surface. The width of the projection may likewise be in the range of a few millimeters, e.g. at 2 mm to 3 mm. According to another embodiment, the projection extends beyond the receiving surface by a distance which is greater than the transverse extension of a permanent magnet. In other words, the projection according to one embodiment is embodied to guide two or more permanent magnets, which are arranged in a peripheral direction one behind the other, and to limit movement at right angles to the radial direction. The two permanent magnets arranged one behind the other in the peripheral direction can be fastened to one another and form a magnet assembly for instance.

According to an embodiment, the projection is embodied monolithically with the pole shoe element. Consequently, according to an embodiment, in which the pole shoe element is formed from ferromagnetic material, the projection is also formed from ferromagnetic material. According to an embodiment, the projection in such an instance is at a distance from an opposing pole shoe element, or, if the projection opposes a further projection of an opposing pole shoe element, is arranged at a distance from the projection of the opposing pole shoe element.

According to a further embodiment, the projection is formed of a separate element which is fastened to the pole shoe element.

According to an embodiment, the pole shoe element has a groove and the guiding facility has a guide element which is inserted into the groove. The guide element may be ferromagnetic, wherein in this case the guide element is arranged at a distance from an opposing pole shoe element or at a distance from a guiding facility of the opposing pole shoe element. According to a further embodiment, the guide element is not ferromagnetic. In such a case, the guide element, according to one embodiment, can be extended between two opposing pole shoe elements. For instance, according to one embodiment, the pole shoe element is a first pole shoe element and the pole shoe arrangement has a second pole shoe element. According to an embodiment of the subject matters disclosed herein, the first pole shoe element and the second pole shoe element are arranged at a distance from one another in such a manner that a depression is formed to receive the permanent magnet. According to an embodiment, the depression is configured so as to receive two or more permanent magnets. According to an embodiment, a plurality of permanent magnets is arranged in the depression. According to an embodiment, the pole shoe elements are embodied so as to form a square-shaped or sectionally square-shaped depression, wherein the square shape is a rectangular square shape. This embodiment of the pole shoe elements may be realized for instance by correspondingly inclined receiving surfaces. A number of permanent magnets can be arranged within a square-shaped section of the depression for instance. The square-shaped or sectionally square-shaped depression allows for the use of square-shaped permanent magnets, which simplifies manufacture and assembly of the permanent magnets. The square-shaped permanent magnets may have a unit size, wherein the square-shaped permanent magnets are preferably combined to form a magnet assembly and are fastened to one another. In conjunction with the staged pole shoe elements, the width of which is reduced in stages in respect of its radial outer end, advantageous forms of magnet assemblies and associated pole shoe elements can thus be realized with permanent magnets of a uniform size.

It goes without saying that the terms "first pole shoe element" and "second pole shoe element" can relate to any two opposing pole shoe elements of the electrical machine.

According to an embodiment, the second pole shoe element comprises a groove and the guide element is inserted into the groove of the first pole shoe element and into the groove of the second pole shoe element and extends between the first pole shoe element and the second pole shoe element. As described above, the guide element is in this instance preferably not ferromagnetic so as to prevent or at least reduce a leakage of magnetic flow.

According to an embodiment, two or more receiving surfaces are arranged between two guide facilities in the radial direction, said receiving surfaces being offset in respect of one another in the peripheral direction. This can be realized for instance such that each pole shoe element has a first width in the peripheral direction, in a first radial inner position, and a second width in the peripheral direction, in a second radial outer position, wherein the first width passes into the second width in stages in the radial direction, wherein the second width is smaller than the first width.

According to an embodiment, the pole shoe arrangement and in particular the pole shoe extends along a longitudinal direction, which proceeds at right angles to a plane of rotation of the rotor. For instance, the pole shoe extends in one embodiment in parallel to the axis of rotation of the rotor. According to another embodiment, the pole shoe element extends obliquely with respect to the axial direction, wherein the inner end of the pole shoe element lies on a cylindrical surface, in order to define a cylindrical inner surface of the machine element and thus a cylindrical air gap.

The front faces of the pole shoe element pointing in the longitudinal direction are, according to an embodiment of the guiding facility arranged adjacent thereto, arranged at a distance from said guiding facility in order thus to keep the permanent magnets arranged on the receiving surface of the pole shoe element at a distance from the front face. This distance between the magnets guided by the guiding facility and the front faces of the pole shoe element or between the magnets guided by the guiding facility and the end plates, which are fastened to the front faces of the pole shoe element, will reduce a leakage of magnetic flow.

In summary, the guiding facility can thus projections, for instance in the form of guiding ribs, or grooves, into which non-ferromagnetic guide elements are arranged, or by any other suitable means for guiding permanent magnets or limiting a movement of the permanent magnets at rights angles to the radial direction. According to an embodiment, a plurality of parallel guiding facilities, for instance guiding ribs is arranged on the pole shoe element, wherein the distance between the guide elements corresponds to the dimensions of the permanent magnets in the longitudinal direction so that each permanent magnet in the longitudinal direction of the pole shoe element is fixed between two guiding facilities. This is advantageous in that identical square-shaped permanent magnets can be used, thereby facilitating the set-up and assembly of the pole shoe arrangement. According to an embodiment, the magnets are inserted in the radial direction from outside inwards into the depression between two pole shoe elements.

According to an embodiment, the permanent magnet or permanent magnets, to which reference is made herein, form(s) part of a magnet assembly, which comprises at least two permanent magnets, which are fastened to one another, in order thus to allow the at least two permanent magnets to be treated as one single piece. This facilitates assembly of the machine element or assembly of the permanent magnets in the depression between two opposing pole shoe elements. According to an embodiment, it is not individual magnets, but instead magnet assemblies which contain two or more individual magnets, which are introduced into the depression.

According to an embodiment, the form of the magnet assembly corresponds to the form of the depression, wherein each magnet assembly is arranged between two guiding facilities.

The projections and grooves are formed according to one embodiment from the same material as the pole shoe element and can, according to one embodiment, when manufacturing the pole shoe element, be formed by correspondingly processing a pole shoe element blank. With the solution which uses two opposing grooves in two pole shoes and a guide element extending therebetween, the guide element is formed of a non ferromagnetic material, which mechanically holds the magnet assembly at the location and position. Guiding the magnet assemblies in the radial direction facilitates assembly of the machine element comprising the pole shoe elements and the magnet assemblies. Similarly, maintenance is simplified, since the magnet assemblies can be inserted and removed in a simple manner.

According to an embodiment of a second aspect of the subject matters disclosed herein, a machine element of an electrical machine is provided, wherein the machine element either forms a rotor or a stator of the electrical machine, the machine element containing: a pole shoe arrangement according to an embodiment of the subject matters disclosed herein; and a permanent magnet, wherein the permanent magnet is arranged on the receiving surface of the pole shoe arrangement and is limited in terms of movement at right angles to the radial direction by means of the guiding facility. Limiting a movement at right angles to the radial direction generally involves a fixing process at right angles to the radial direction.

According to a further embodiment, the permanent magnet is a permanent magnet from a plurality of permanent magnets which form a magnet assembly. As explained above, according to an embodiment, the permanent magnets of a magnet assembly are fastened to one another so that the entire magnet assembly can be inserted into the pole shoe arrangement of the machine element. The insertion takes place according to one embodiment in a radial direction, which is directed from one outer end of the pole shoe element to an inner end of the pole shoe element, wherein the inner end of the pole shoe element opposes an air gap of the electrical machine.

According to embodiments of the second aspect, the machine element is adjusted to deliver the functionality of one or a number of the afore-cited embodiments and/or to provide the functionality, as required for one or a number of the afore-cited embodiments, in particular for the embodiments of the first aspect.

According to an embodiment of a third aspect of the subject matters disclosed herein, an electrical machine is provided, the electrical machine containing a stator and a rotor, wherein either the rotor or the stator is formed by a machine element according to one of the preceding claims. According to an embodiment, either the rotor or the stator is embodied by a machine element according to an embodiment of the subject matters disclosed herein and a further machine element is formed as the other of the rotor and the stator, wherein the machine element can be arranged radially outside of the further machine element. For instance, the machine element may form a rotor of the electrical machine and the electrical machine may be embodied as an external rotor, wherein the rotor can be rotated about the stator. According to a further embodiment, the rotor can be arranged so as to be rotatable radially within the stator.

According to embodiments of the third aspect of the subject matters disclosed herein, the electrical machine is adjusted to deliver the functionality of one or a number of the afore-cited embodiments and/or to provide the functionality, as is required by one or a number of the afore-cited embodiments, in particular the embodiments of the first and/or second aspect.

According to a fourth aspect of the subject matters disclosed herein, a method is provided for assembling a machine element of an electrical machine, the method containing: provision of a pole shoe arrangement comprising two pole shoe elements, which form a depression therebetween, wherein each pole shoe element comprises an inner end and an outer end opposing the inner end and wherein the inner end is embodied so as to oppose an air gap of the electrical machine when the pole shoe element is in an assembled state. According to an embodiment, the method includes provision of a guiding facility, which is embodied so as to guide a permanent magnet in a radial direction from the outer end to the inner end and to limit a movement of the permanent magnet at right angles to the radial direction. According to a further embodiment, the method includes a radial insertion of the permanent magnet into the depression, wherein during radial insertion the guiding facility limits movement of the permanent magnet at right angles to the radial direction.

According to embodiments of the fourth aspect, the method is set up to deliver the functionality of one or a number of the afore-cited embodiments and/or to deliver the functionality, as is required by one or a number of the afore-cited embodiments, in particular the embodiments of the first, the second and/or the third aspect.

Subsequently, further embodiments of the subject matters disclosed herein are described, wherein the embodiments below can be combined arbitrarily with the preceding embodiments or can be applied to the preceding embodiments.

According to a further aspect of the subject matters disclosed herein, the pole shoe arrangement is provided for a machine element (e.g. a rotor) of an electrical machine, in particular for a direct drive external rotor generator concept, in which the electrical machine includes a stator and the rotor, which can be rotated about the stator.

According to an embodiment, the pole shoe arrangement includes a first pole shoe element, which is formed from ferromagnetic material, and a second pole shoe element, which is formed from ferromagnetic material, wherein the first pole shoe element and the second pole shoe element are fastened to a support structure, for instance to a rotor support structure. The first pole shoe element and the second pole shoe element extend in an axial direction of the rotor and are arranged at a distance in respect of one another in a peripheral direction of the rotor such that the depression is formed in order to receive a magnet assembly. Each pole shoe element has, in the peripheral direction, a first width in a first radial inner position, and in the peripheral direction, a second width in a second radial outer position, wherein in the radial position the first width passes into the second width in stages and wherein the second width is smaller than the first width.

The term "support structure" can relate in this context to a structure of a machine element, for instance of a rotor, to which all necessary elements are fastened.

The term "pole shoe element" generally relates to magnetic elements, which supply a flow distribution of the flow provided by the magnets. The pole shoe elements can be steel rods, for instance steel rotor rods, which receive the magnets and the magnetic flow. In conventional systems, a pole shoe is arranged as a separate element between magnets, wherein the pole shoe is fastened to the rotor surface with gaps between the pole shoes and the magnets. The use of the pole shoe arrangement described herein improves the distribution of the magnetic field, which flows through the rotor, while similarly an electrical insulation is supplied between adjacent magnets.

Poles between the pole shoe elements can be supplied by the magnets.

Embodiments of the pole shoe arrangement described herein with widths which change in stages is based on the idea that by using the described arrangement, an improved assembly of the outer-lying machine element can be achieved, since the magnets can be introduced into the machine element once the rotor and the stator have been combined. The basis of the described arrangement is to modularize the construction of the surfaces of assembled permanent magnet topology machine elements, whilst also improving the flow concentration or distribution. Even if however the machine element forms and inner-lying machine element, assembly of the permanent magnet(s) is in any case facilitated by embodiments of the subject matters disclosed herein, which enable insertion of the permanent magnet into the machine element in the radial direction.

Use of the described arrangement can provide for a completely modular machine element surface, wherein the entire surface of the machine element opposing the air gap is produced from separate components. Since, according to an embodiment, all components, e.g. pole shoe elements and magnets are radially accessible from the outside, maintenance and repair of the machine element, in particular of magnets which have failed, can be easier.

According to an embodiment of the subject matters disclosed herein, the first pole shoe element and the second pole shoe element are fixed to the support structure by means of bolts. The support structure may comprise various parts, to which the pole shoe elements can be fixed. In another embodiment, the first pole shoe element and the second pole shoe element are fixed to the support structure by means of adhesive or bolts or another fastening measure.

According to a further embodiment, the ferromagnetic material is magnetic steel. The composition of the magnetic steel can vary provided the magnetic steel provides a ferromagnetic characteristic in order to receive the flow of the magnets.

According to a further embodiment, part of each pole shoe element, which is arranged at an end of the machine element directed radially inwards, is embodied as a lamination structure part.

A lamination structure can be used to reduce eddy current losses, which may occur in such a machine element. In particular, this part of the pole shoe element can be manufactured from laminated steel sheets. The remainder of the pole shoe element can be in the form of a solid structure. This can provide for good stability of the pole shoe element and good distribution of the flow. The lamination can exist in an axial or peripheral direction, according to the further machine element opposing the machine element, which may be a stator for instance, if the machine element forms a rotor of the electrical machine.

According to a further embodiment, the lamination structure part has a cross-sectional trapezoid shape at right angles to the axial direction of the rotor.

In general the pole shoe element, according to one embodiment, can comprise a radial inner part, which includes the inner end of the pole shoe element, and wherein the radial inner part has a trapezoid-shaped cross-section, in such a way that the width of the radial inner part reduces radially outwards in one direction. The term "width of the pole shoe element" relates here and generally herein to the dimensions of the poles shoe element in the peripheral direction.

As a result that the pole shoe elements have a trapezoid-shaped cross-section in their radial inner part in a plane at right angles to the axial direction of the rotor, said pole shoe elements can be arranged close to one another, wherein the tips of the trapezoid can abut one another. According to another embodiment, the tips of the trapezoid of adjacent pole shoe elements can be arranged at a distance from one another. If the magnet assembly has a rectangular form, an air gap can be achieved between the air gap between the rotor and stator, the magnet and the pole shoe elements. In other words, the magnet assembly is in this case arranged at a distance from the air gap between the rotor and the stator. This can improve the flow distribution.

According to a further embodiment, a non-ferromagnetic cover is fastened to the magnet assembly.

A cover can provide protection for the magnets and can also provide a fastening of the magnets. Furthermore, the cover can provide a fastening for eliminating the vibration in the radial direction on account of magnet part tolerances. The cover may be a non ferromagnetic steel or aluminum, positioned on the outer periphery of the magnet assembly. The cover may comprise a layer of soft or dampening material (such as foam or rubber), which is positioned between the cover and the magnet assembly. By sliding the cover from the outer periphery in the radial direction, the flexible or soft material can allow the cover to move as far downwards as is required on account of the tolerances of the magnets or the magnet assemblies.

The cover can be screwed to the pole shoe elements. This can likewise help to hold the magnet assemblies at the location and position.

In addition to the mechanical dampening, the dampening material can also serve as a seal, in order to rule out particles, moisture or salty air, water or any other type of liquid or dirt from penetrating into the electrical machine.

According to a further embodiment, end plates are arranged on the axial ends of the machine element (e.g. of the rotor).

The pole shoe elements can be arranged at an angle between the end plates in order to allow for an offset. The end plates can be manufactured from non-magnetic material in order to prevent a short-circuiting of the magnets. The end plates can be used to fasten the pole shoe elements to the machine element (e.g. to the rotor).

According to a further aspect of the subject matters disclosed herein, an electrical machine is provided, including a stator and a rotor as described above, wherein the rotor can be rotated in respect of the stator and one of the rotor and the stator is formed by a machine element according to one or a number of the embodiments disclosed herein. According to an embodiment, the machine element is arranged so as to lie outside, i.e. the machine element forms an outer-lying rotor or an outer-lying stator. As generally conventional, "outer-lying" in this context means that the machine element is arranged radially outside of the further machine element.

The electrical machine provided is based on the idea that magnets can be inserted into the machine element, once the rotor and the stator have been combined. This can be achieved by the outer-lying arrangement of pole shoe elements, which provide an opening to the exterior of the machine element for insertion of the magnet assembly.

According to a further aspect of the subject matters disclosed herein, a wind turbine is provided to generate electrical power. The provided wind turbine includes a tower, a wind turbine rotor, which is arranged on an upper part of the tower and which comprises at least one blade, and an electrical machine in the form of a generator as described herein, wherein the generator is mechanically coupled to the wind turbine rotor, for instance without interconnection of a drive (direct drive generator).

When designing a wind turbine, it is advantageous to keep the mass in an upper area of the tower, i.e. in particular the mass of the gondola and of the generator, to a minimum. In this way, costs for transportation and for groundwork and the tower are relatively low. A low weight of the generator can be achieved with a provided nominal output of the generator by permanent magnets for instance, which contain rare earths (rare earth magnets). Nevertheless rare earth magnets are expensive and have very high magnetic forces. Replacement of the rare earth magnets in a conventional generator is barely possible after installation of the generator in a wind turbine.

A generator according to embodiments of the subject matters disclosed herein resolves or at least reduces some of the problems of conventional generators for wind turbines. According to an embodiment of the subject matters disclosed herein, the at least one permanent magnet is a ferrite magnet. Although as a result with the same nominal output the mass of the generator can be higher than with conventional generators with rare earth magnets, the generator is more cost-effective to manufacture and the price level of the ferrite magnet is more constant than that of the rare earth magnet. Furthermore, the magnets can be easily replaced, even if the generator is already installed in the wind turbine. Particularly for external rotors (i.e. a generator with an outer-lying rotor), replacement can take place easily, for instance using a small crane in the gondola. Therefore installation or replacement of defective magnets can only then take place if the generator is already installed in the wind turbine. A further advantage of ferrite magnets is that the magnet temperature is less problematic than in the case of rare earth magnets and thus cooling of the generator is facilitated.

According to an embodiment, the ferrite magnets are assembled in the generator in the form of a magnet assembly. In general, it is cost-effective and efficient to manufacture the permanent magnets in a standard size and to arrange the same in an assembly.

According to an embodiment, the electrical machine is a directly driven generator of a wind turbine with an outer-lying rotor.

It must be noted that embodiments were described with respect to various subject matters. In particular, some embodiments were described with respect to claims of the apparatus type, while other embodiments were described with respect to claims of the method type. Nevertheless, a person skilled in the art will infer from the preceding and subsequent description that unless otherwise specified, in addition to each combination of features which belongs to a type of subject matters, each combination between features, which relate to various subject matters, in particular between features of claims of the apparatus type and features of claims of the method type are considered to be disclosed with this document.

BRIEF DESCRIPTION OF THE DRAWINGS

The above-defined aspects and further aspects of the present invention are clear from the examples of the embodiments, which are to be described below, and which are explained with reference to the exemplary embodiments. The invention is described in more detail herein below with reference to exemplary embodiments to which the invention is nevertheless not restricted.

DETAILED DESCRIPTION OF INVENTION

The representation in the drawings is schematic. It is noted that similar or identical elements are provided with the same reference numerals in various figures.

Figure 1:
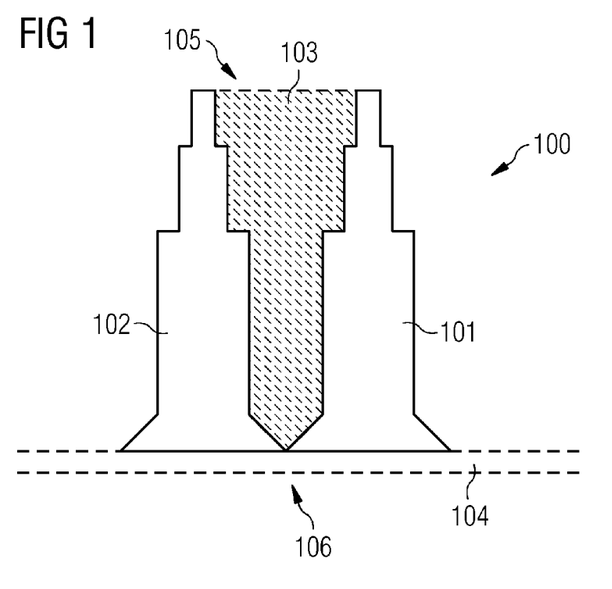
FIG. 1 shows a pole shoe arrangement according to embodiments of the subject matters disclosed herein.

FIG. 1 shows a pole shoe arrangement 100. The pole shoe arrangement can be used for instance for a rotor of an electrical machine, wherein the electrical machine comprises a stator and the rotor, which can be rotated about the stator. According to another embodiment (not shown), the rotor can be arranged so as to be rotatable within the stator, wherein in this case, the outer-lying stator can comprise the pole shoe arrangement 100 for instance. Alternatively, the inner-lying rotor or an inner-lying stator can also comprise the pole shoe arrangement 100. The pole shoe arrangement includes a first pole shoe element 101 and a second pole shoe element 102. Both pole shoe elements can be produced from ferromagnetic material, such as ferromagnetic steel. The pole shoe elements can receive the flow of the magnet assembly. According to an embodiment, the electrical machine, as is described in respect of the drawings, is a generator. According to a further embodiment, the machine element, as is described in respect of the drawings, is a rotor. It is apparent however that this is only exemplary and that according to other embodiments, the electrical machine can be a motor and/or the machine element a stator for instance.

Figure 3:
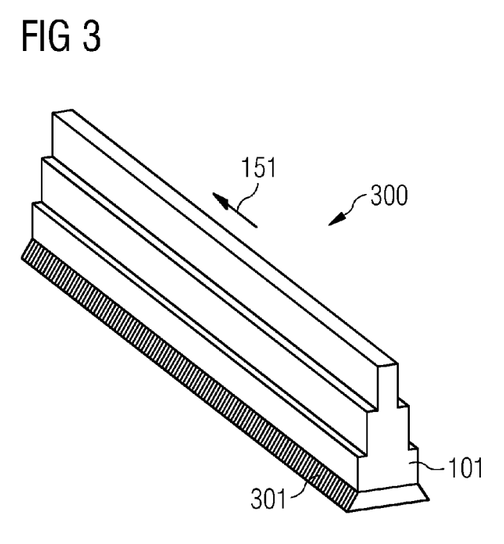
FIG. 3 shows a further pole shoe arrangement according to embodiments of the subject matters disclosed herein.

The pole shoe elements 101, 102 are fastened to the rotor for instance to a rotor support structure (not shown). The pole shoe elements extend in a longitudinal direction 151, for instance in an axial direction, as can be seen in FIG. 3, where the pole shoe element 101 of a pole shoe arrangement 300 is shown in an axial view. The pole shoe elements 101, 102 are arranged at a distance in respect of one another in a peripheral direction of the rotor, such that a depression is formed in order to receive a magnet assembly 103. The form of the depression can correspond to the form of the magnet assembly. For instance, the contour of the magnet assembly can be complementary to the contour of the depression. Each pole shoe element has a first width in the peripheral direction in a first radial inner position and has a second width in the peripheral direction in a second radial outer position. In other words, the pole shoe elements become thinner toward the radial outer end of the rotor. Nevertheless, the inner widths in this case are larger than the outer widths. The transitions between widths are formed in stages according to one embodiment. According to another embodiment, the transition between the first width and the second width can take place continuously. For instance, the pole shoe element according to one embodiment can comprise a conical cross-section.

The largest width is in a position close to the air gap 104 between the rotor and the stator 106 (or the magnetic air gap of the electrical machine). The smallest width is in a position close to the exterior 105 (air) of the rotor. For instance, the pole shoe element 101, 102, may be the largest width at its inner end facing the air gap 104 and the smallest width at its outer end opposing the inner end.

Figure 2:
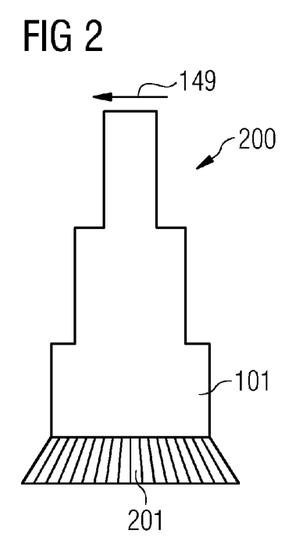
FIG. 2 shows a further pole shoe arrangement according to embodiments of the subject matters disclosed herein.

FIG. 2 shows a pole shoe arrangement 200 according to embodiments of the subject matters disclosed herein.

According to an embodiment, the widest part of the pole shoe element 101 in the peripheral direction, i.e. the part 201, which is also closest to the magnetic air gap of the electrical machine, at right angles to the longitudinal direction (for instance perpendicular to the longitudinal direction) can have a cross-section in the form of a trapezoid, which tapers in terms of its width in the direction away from the air gap, as shown in FIG. 2. This part 201 of the pole shoe element 101 can be manufactured from a lamination structure. This may be advantageous in terms of reducing eddy current losses. As shown in FIG. 2, the laminations can be arranged extensively, i.e. the sequence of various layers of lamination takes place in a peripheral direction 149.

According to another embodiment, an axial arrangement of the laminations is shown in FIG. 3, i.e. the sequence of layers in the part 301 of the pole shoe element 101, which opposes the air gap, takes place in the longitudinal direction 151. According to an embodiment, the arrangement of laminations should correspond to the arrangement of the stator.

Figure 4:
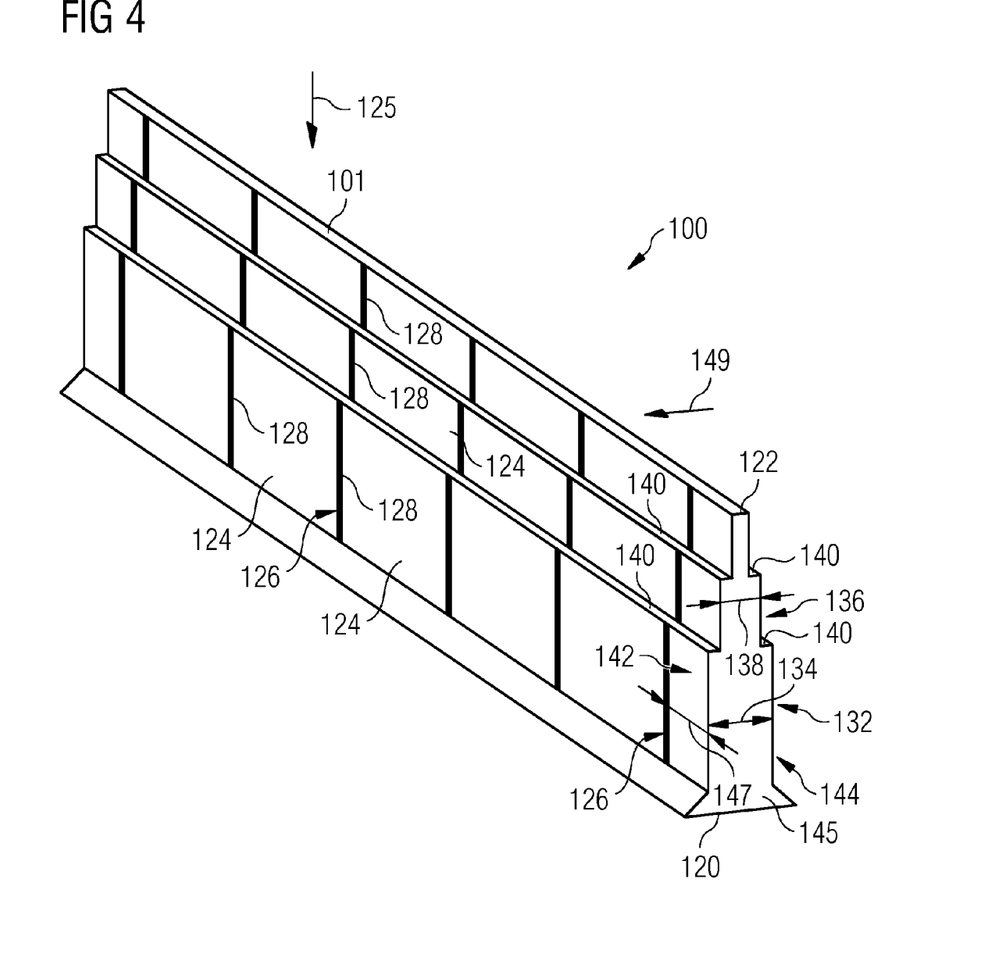
FIG. 4 shows a further pole shoe arrangement according to embodiments of the subject matters disclosed herein.

FIG. 4 shows a pole shoe arrangement 100 according to embodiments of the subject matters disclosed herein.

The pole shoe arrangement 100 in FIG. 4 shows a pole shoe element 101, which has an inner end 120, opposing the air gap of the electrical machine, i.e. facing this, if the pole shoe element 101 is assembled at its provided position in the electrical machine, i.e. is in an assembled state. According to an embodiment, the pole shoe element comprises an outer end 122 opposing the inner end 120, wherein the pole shoe element 101 has a receiving surface 124 between the inner end 120 and the outer end 122, which is provided to receive one or a number of permanent magnets. According to an embodiment, one or a number of permanent magnets is arranged (not shown in FIG. 4) on the receiving surfaces 124 of the pole shoe element 101. According to an embodiment, a number of receiving surfaces 124 can be provided in a radial direction 125, for instance three receiving surfaces 124, as shown in FIG. 4.

According to an embodiment, the pole shoe element 101 comprises a guiding facility 126, wherein the guiding facility is embodied to guide the permanent magnet, which is arranged on the receiving surface 124, in the radial direction 125 from the outer end 122 to the inner end 120 and to limit a movement of the permanent magnet at right angles to the radial direction 125. This prevents magnets already arranged on the receiving surface from moving laterally, i.e. at right angles to the radial direction, if a further permanent magnet is arranged in the vicinity of the already present permanent magnet. Assembly and disassembly of the electrical machine is significantly simplified in this way.

According to an embodiment, each pole shoe element in a first radial inner position 132 in the peripheral direction 149 has a first width 134 and in a second radial outer position 136 in the peripheral direction 149 has a second width 138. According to an embodiment of the subject matters disclosed herein, the first width passes in the radial direction 125 into the second width in stages so as to form a stage 140. According to an embodiment, the receiving surfaces 124 of the pole shoe element 101 are separated from one another by means of the stages 140, as shown in FIG. 4. According to an embodiment, the pole shoe element 101 can comprise a single stage, accordingly two receiving surfaces 124 in the radial direction 125. According to a further embodiment, two or more stages 140 can be provided, for instance two stages 140, as shown in FIG. 4. According to an embodiment, the pole shoe element is embodied symmetrically in terms of its function, i.e. two sides 142 and 144 of the pole shoe element 101 facing away from one another are embodied in a way such that both sides 142, 144 have receiving surfaces 124 and guiding facilities 126. This is advantageous in that a single pole shoe element 101 can be equipped on both sides with permanent magnets.

According to an embodiment, a guiding facility 128, which is adjacent to a front face 145 of the pole shoe element, is arranged at a distance 147 from the front face 145. In other words, according to an embodiment, an outermost permanent magnet in the longitudinal direction (not shown in FIG. 4) is arranged at an axial distance from the front face 145. In this way, the front permanent magnet is arranged at a distance from an end plate, which is arranged on the front face 145 of the pole shoe element. This can reduce a leakage of magnetic flow. The end plate is not shown for the sake of clarity in FIG. 4, but is however described and displayed with reference to FIG. 8 and FIG. 9.

According to an embodiment, the guiding facility 126 comprises at least one projection 128, which projects beyond the receiving surface 124.

Figure 5:
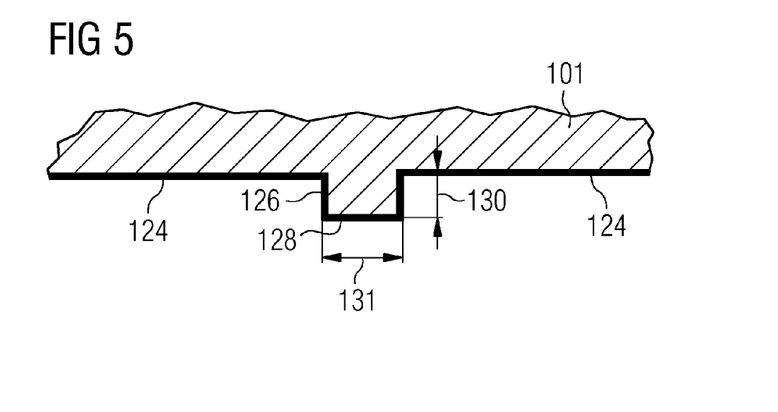
FIG. 5 shows a cross-sectional view of part of a pole shoe element of the pole shoe arrangement from FIG. 4.

FIG. 5 shows a cross-sectional view of part of the pole shoe element 101 from FIG. 4.

As shown in FIG. 5, the projection 128 of the guiding facility 126 projects about a distance 130 beyond the receiving surface 124. Further, the projection 128 comprises a projection width 131. The distance 130 and the projection width 131 are, according to an embodiment, in the range of a few millimeters, for instance between 2 millimeters and 3 millimeters. According to an embodiment, the projection is embodied monolithically with the pole shoe element 101. For instance, the projection can be formed in the pole shoe element by means of mechanical processing, for instance machining processing.

Figure 6:
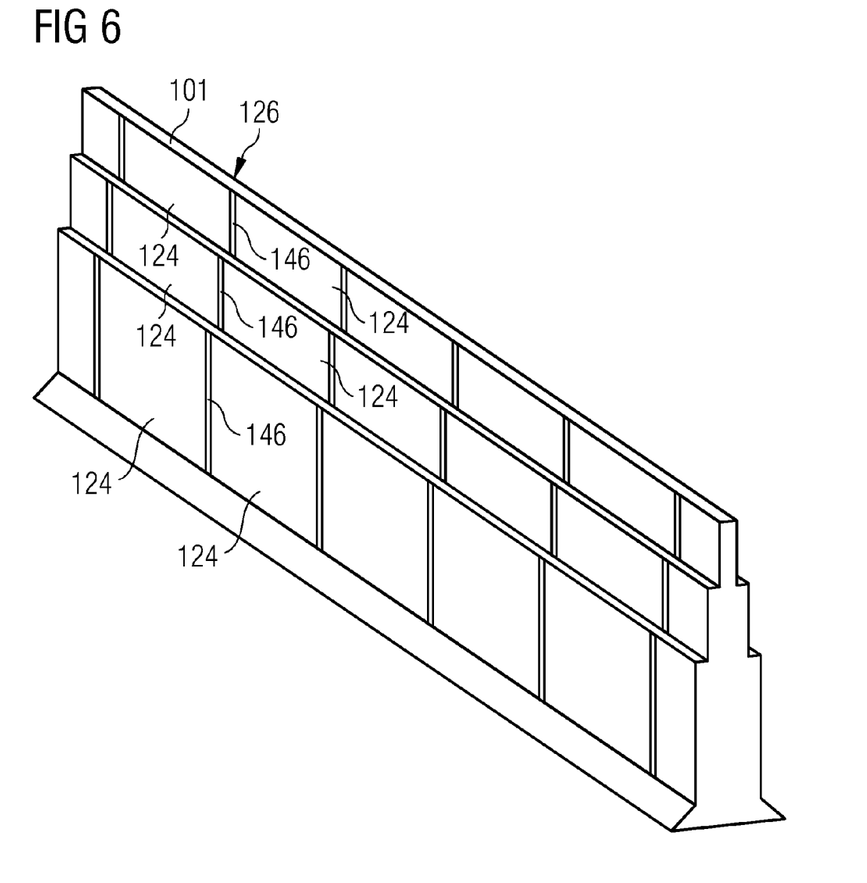
FIG. 6 shows a pole shoe element according to embodiments of the subject matters disclosed herein.

FIG. 6 shows a further pole shoe element 101 according to embodiments of the subject matters disclosed herein.

Except for the guiding facility 126 which is embodied differently, the pole shoe element 101, which is shown in FIG. 6, is identical to the pole shoe element 101, which is shown in FIG. 4, as a result of which the detailed description hereof is not repeated.

According to an embodiment, the guiding facility 126 between two receiving surfaces 124 comprises a groove 146 in the pole shoe element 101, into which a guide element can be inserted.

Figure 7:
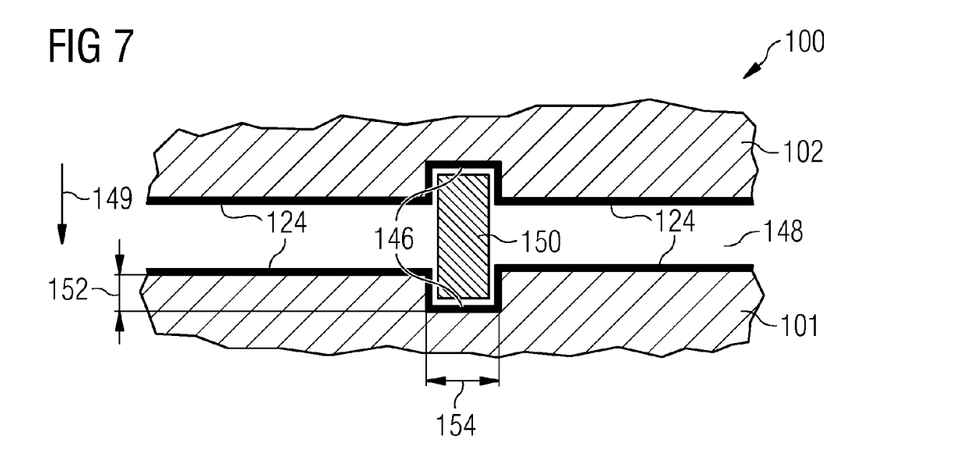
FIG. 7 shows a pole shoe arrangement according to embodiments of the subject matters disclosed herein.

FIG. 7 shows a pole shoe arrangement 100 according to embodiments of the subject matters disclosed herein.

The pole shoe arrangement 100 in FIG. 7 comprises a plurality of pole shoe elements, of which a first pole shoe element 101 and a second pole shoe element 102 are shown in FIG. 7. The first pole shoe element 101 and the second pole shoe element 102 are arranged opposite one another and at a distance from one another so that a depression 148 is formed between the first pole shoe element 101 and the second pole shoe element 102. The depression 148 is delimited in a peripheral direction 149 by the receiving surfaces 124 of the pole shoe elements 101, 102, as shown in FIG. 7. According to an embodiment, the depression 148 is embodied to receive permanent magnets.

Each pole shoe element 101, 102 includes a groove 146. According to an embodiment, each pole shoe element 101, 102 is embodied like the pole shoe element 101 in FIG. 6. For the sake of clarity, only two opposing grooves 146 of the pole shoe elements 101, 102 are shown in FIG. 7. According to an embodiment, the pole shoe arrangement 100 includes a guide element 150, which is not ferromagnetic and which is inserted into the groove 146 of the pole shoe elements 101, 102. According to an embodiment, the guide element 150 extends between the two opposing pole shoe elements 101, 102. According to an embodiment, the guide element 150 comprises a contour on its surface facing the groove 146, which corresponds to the contour of the pole shoe element in the groove 146 and at the stages 140.

According to an embodiment, the groove 146 has a groove depth 152 and a groove width 154, which each lie in the range of a few millimeters, e.g. at 2 millimeters to 3 millimeters.

According to a further embodiment (not shown in FIG. 7), the guide element 150 only extends across a limited distance over the receiving surface 124, wherein the guide element is arranged at a distance from the opposing pole shoe element and at a distance from the opposing guide element in the opposing pole shoe element. In other words, the guide element 150 can be embodied so as to form just one projection, which projects beyond the receiving surface 124, similar to the projection 128 in FIG. 4. In this case, it is not a single guide element 150 which is assigned to the opposing grooves of two opposing pole shoe elements but a separate guide element 150 is instead arranged in each of the opposing grooves 146. Provided the opposing guide elements 150 of two adjacent pole shoe elements 101, 102 are arranged at a distance from one another, the guide element 150 can be ferromagnetic.

According to an embodiment, the groove 146 is used to fasten or assists with the fastening of the guide element 150 on the pole shoe element 101, 102. According to another embodiment, no groove 146 is provided. The groove 146 and/or another fastening means can generally be provided to fasten the guide element 150 on the pole shoe element 101, 102. Such a different fastening means may include for instance a welding, an adhesive, a screwing, a riveting, etc. For instance, the guide element 150 can be welded or glued to the pole shoe element 101, 102.

Figure 8:
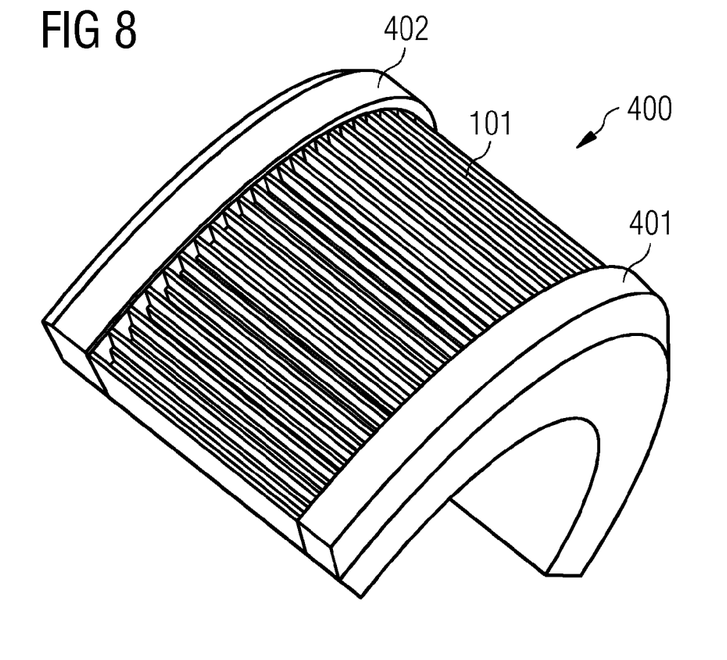
FIG. 8 shows a rotor according to embodiments of the subject matters disclosed herein.

As shown in FIG. 8, end plates 401, 402 can be arranged on the axial ends of the rotor 400 (for instance on the front faces of the pole shoe elements 101), e.g. in the form of a front plate and a rear plate. The pole shoe elements 101 can be fastened to the rotor by means of welding or be screwed to the end plates. A plurality of pole shoe elements 101 can be arranged on the rotor structure, wherein each extends between two end plates and is arranged at a distance from the next pole shoe element so as to form a depression for the magnet assembly.

Figure 9:
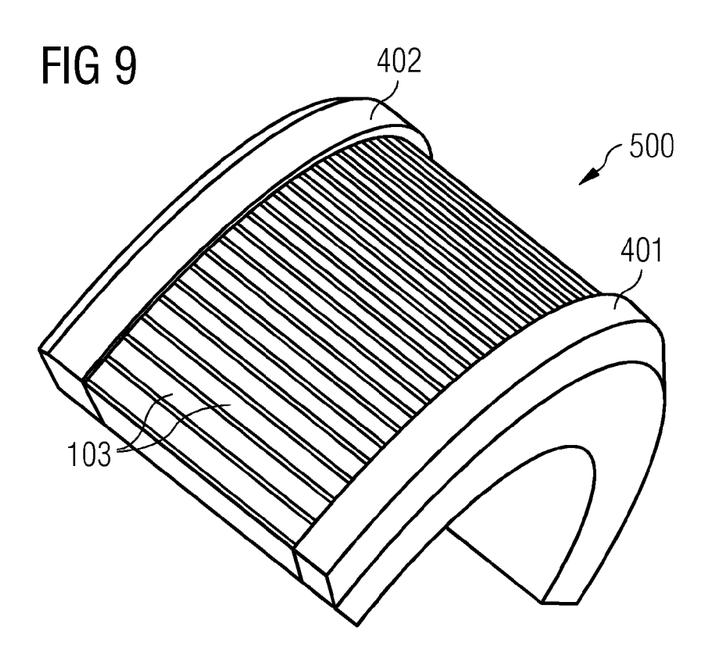
FIG. 9 shows a further rotor according to embodiments of the subject matters disclosed herein.

As shown in FIG. 9, the magnet assemblies 103 can be inserted into the depressions, which are provided by the pole shoe elements. According to an embodiment, the radial outer surface of the rotor 500 is then covered with magnet assemblies. The magnet assemblies can be covered with a non-magnetic material, which provides protection.

Figure 10:
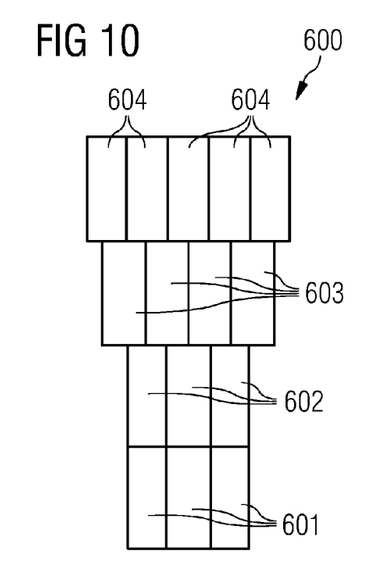
FIG. 10 shows a magnet assembly according to embodiments of the subject matters disclosed herein.

According to an embodiment, the magnet assembly, as shown by way of example by the magnet assembly 600 in FIG. 10, is made up of a plurality of individual permanent magnets 601 to 604, which form the contour of the depression. The individual magnet pieces (permanent magnets) are preferably no larger than 25 cm in edge length.

In the example shown in FIG. 10, the magnet assembly is composed of 15 parts. The magnet pieces (permanent magnets) have exactly the same dimensions. This can be advantageous in that the design is modular and the various magnet pieces can be easily handled. The magnet pieces may comprise different materials. For instance, the magnet pieces 601, which are closer to the air gap, have a higher coercive field strength so as to better withstand an end magnetization field, which accompanies the magnet in the event of a short circuit. The other magnet pieces 602, 603 and 604 may have a lower coercive field strength.

Figure 11:
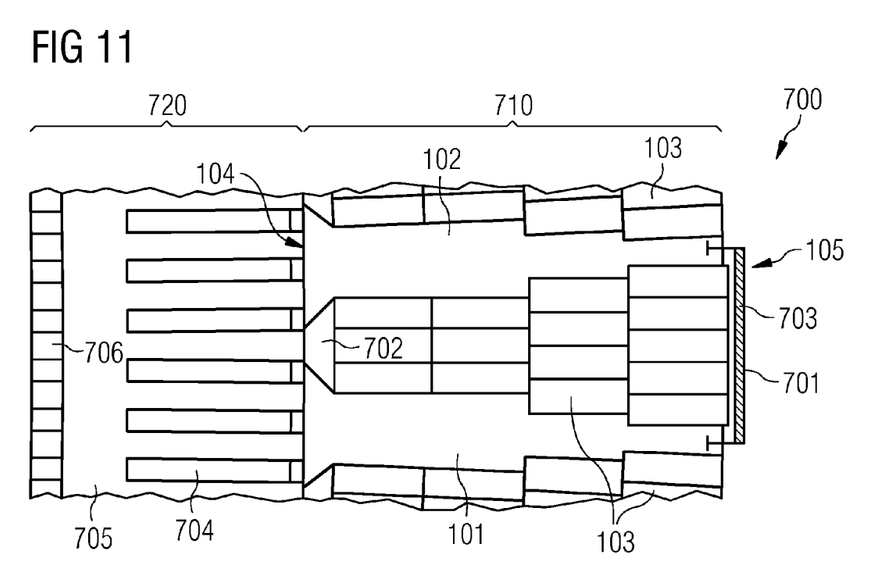
FIG. 11 shows an electrical machine according to embodiments of the subject matters disclosed herein.

FIG. 11 shows a part of a completely electrical machine 700 according to embodiments of the subject matters disclosed herein in the form of a generator, in particular in the form of a wind turbine generator. The rotor 710 is arranged so as to be rotatable about the stator 720. The stator is connected to a shaft 706 and comprises a coil arrangement 705, wherein air gaps 704 are formed between the coils.

An air gap 104 is formed between the rotor 710 and the stator 720. Furthermore, an air gap 702 is formed by the pole shoe elements 101, 102 and the magnet assembly 103. A further magnet assembly 103 can be arranged on the sides of the pole shoe elements, which lie opposite to the magnet assembly 103. Reference is expressly made to the fact that it is not permitted to interchange the air gaps 702 and 704 with the air gap 104 between the rotor 710 and the stator 720. Provided reference is made herein at another point to an "air gap", the air gap between the rotor and the generator is always meant, unless otherwise specified as in the case of air gaps 702 and 704. As described herein, the magnet assemblies according to an embodiment can comprise a plurality of ferrite magnets fastened to one another.

A cover 701 can be arranged on top of the magnet assembly 103 toward the rotor exteriors 105, which may be air. This can provide protection against contamination. If the cover 701 is formed from a non-magnetic material, this can also provide protection against short-circuits and reduce a leakage of magnetic flow. In order to reduce vibrations, a dampening material 703 can be arranged between the cover 701 and the magnet assembly 103.

The pole shoe arrangements and magnet assemblies described herein can provide the following advantages: no return iron path is required; instead, a non-magnetic cover can be used with a dampening effect. No front iron path is required, which results in an air gap between the pole shoes in a peripheral direction. A modular magnet module design can be achieved by using the same geometric dimensions of the magnet pieces. This can also result in simple assembly on account of the puzzle-type design, where all magnet modules are inserted between two rotor pole shoe elements. The modularity of the design can also allow for assembly from the side (air), which can reduce transport costs. Furthermore, service and maintenance of the rotor are easier, on account of easier access to the magnet modules and the pole elements. The modular design also allows for the ability to replace in the event of a faulty magnet module or pole shoe element. Since mechanical and electromagnetic structure functionality are combined, an optimized use of material and a compact electrical machine can be achieved.

The dimensions provided herein are only to specify exemplary possible dimensions for the relevant elements. It is apparent that these exemplary dimensions are always to be adjusted to the requirements and the size of the electrical machine and the exemplary dimensions can thus be significantly exceeded or indeed not be met.

It should also be noted that the terms "comprising" and "including" do not exclude other elements or steps and "a"

does not exclude a plurality. Elements, which are described in conjunction with different embodiments, can also be combined. It should also be noted that reference characters in the claims are not to be configured as limiting to the scope of the claims.

In summary, a pole shoe arrangement 100 for a rotor or a stator of an electrical machine is disclosed, wherein the electrical machine comprises the stator, the rotor and an air gap between the stator and the rotor. The pole shoe arrangement 100 contains a pole shoe element 101, which has an inner end 120, which is embodied so as to lie opposite the air gap of the electrical machine when the pole shoe element 101 is in an assembled state. Furthermore, the pole shoe element 101 comprises an exterior end 122 opposing the inner end 120. The pole shoe element 101 comprises a receiving surface 124 for receiving a permanent magnet between the inner end 120 and the outer end 122. Furthermore, the pole shoe arrangement 101 comprises a guiding facility 126 for the permanent magnet, wherein the guiding facility 126 is embodied so as to guide the permanent magnet in a radial direction 125 from the outer end 122 to the inner end 120 and to limit a movement of the permanent magnets at right angles to the radial direction 125.

The invention claimed is:

1. A pole shoe arrangement for an electrical machine comprising a stator, a rotor and an air gap between the stator and the rotor, comprising:
   a pole shoe element comprising:
      an inner end lying opposite the air gap when the pole shoe element is in an assembled state,
      an outer end opposing the inner end,
      wherein an inner width in the peripheral direction along the inner end is larger than an outer width in the peripheral direction along the outer end of the pole shoe element, and
      a receiving surface for receiving a permanent magnet between the inner end and the outer end; and
   a guiding facility adapted to guide the permanent magnet in a radial direction from the outer end to the inner end and to limit a movement of the permanent magnet at right angles to the radial direction.

2. The pole shoe arrangement as claimed in claim 1, wherein the guiding facility comprises at least one projection that projects beyond the receiving surface, and wherein the at least one projection is embodied monolithically with the pole shoe element, wherein the at least one projection forms a stop surface for the permanent magnet.

3. The pole shoe arrangement as claimed in claim 1, wherein the pole shoe element comprises a groove, and wherein the guiding facility comprises a guide element that is not ferromagnetic and is inserted into the groove.

4. The pole shoe arrangement as claimed in claim 3, wherein the pole shoe arrangement comprises a second pole shoe element, and wherein the pole shoe element and the second pole shoe element are arranged at a distance from one another for forming a depression for receiving the permanent magnet.

5. The pole shoe arrangement as claimed in claim 4, wherein the second pole shoe element comprises a groove, and wherein the guide element is inserted into the groove of the second pole shoe element and extends between the pole shoe element and the second pole shoe element.

6. A machine element of an electrical machine comprising a stator, a rotor and an air gap between the stator and the rotor, wherein the machine element forms the stator or the rotor, comprising:
   a pole shoe arrangement as claimed in claim 1; and
   a permanent magnet arranged on a receiving surface of a guiding facility that limits a movement of the permanent magnet at right angles to a radial direction.

7. The machine element as claimed in claim 6, further comprising a plurality of permanent magnets that form a magnet assembly.

8. The machine element as claimed in claim 6, wherein the permanent magnet is a ferrite magnet.

9. An electrical machine, comprising:
   a stator; and
   a rotor that is rotated in respect of the stator,
   wherein the rotor or the stator is formed by a machine element as claimed in claim 6.

10. The electrical machine as claimed in claim 9, wherein the electrical machine is a generator of a wind turbine.

11. A method for assembling a rotor of an electrical machine, comprising:
   providing a pole shoe arrangement comprising two pole shoe elements that form a depression between the two pole shoe elements, wherein each pole shoe element comprises an inner end and an outer end opposing the inner end, and wherein the inner end lies opposite an air gap of the electrical machine when the each pole shoe element is in an assembled state, wherein an inner width in the peripheral direction along the inner end is larger than an outer width in the peripheral direction along the outer end of the pole shoe element; and
   providing a guiding facility to guide a magnet assembly in a radial direction from the outer end to the inner end and to limit a movement of the magnet assembly at right angles to the radial direction during radially inserting the magnet assembly into the depression.

* * * * *